United States Patent
Kim et al.

(10) Patent No.: US 10,072,110 B2
(45) Date of Patent: Sep. 11, 2018

(54) PROPYLENE-BASED ELASTOMER

(71) Applicant: LG CHEM, LTD., Seoul (KR)

(72) Inventors: Seul Ki Kim, Daejeon (KR); Eun Jung Lee, Daejeon (KR); In Sung Park, Daejeon (KR); Choong Hoon Lee, Daejeon (KR); Byoung Soo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 295 days.

(21) Appl. No.: 15/025,834

(22) PCT Filed: Jun. 10, 2015

(86) PCT No.: PCT/KR2015/005836
§ 371 (c)(1),
(2) Date: Mar. 29, 2016

(87) PCT Pub. No.: WO2015/190831
PCT Pub. Date: Dec. 17, 2015

(65) Prior Publication Data
US 2016/0244542 A1    Aug. 25, 2016

(30) Foreign Application Priority Data

Jun. 10, 2014 (KR) .................. 10-2014-0070113
Jun. 9, 2015 (KR) .................. 10-2015-0081131

(51) Int. Cl.
C08F 210/06    (2006.01)
C08F 4/659    (2006.01)

(52) U.S. Cl.
CPC ........ *C08F 210/06* (2013.01); *C08F 4/65908* (2013.01); *C08F 4/65912* (2013.01)

(58) Field of Classification Search
CPC . C08F 210/06; C08F 4/65908; C08F 4/65912
See application file for complete search history.

(56) References Cited

U.S. PATENT DOCUMENTS

| 5,064,802 A | 11/1991 | Stevens et al. |
| 5,677,408 A | 10/1997 | Ueda et al. |
| 6,525,157 B2 | 2/2003 | Cozewith et al. |

(Continued)

FOREIGN PATENT DOCUMENTS

| CN | 1538977 A | 10/2004 |
| EP | 1462464 A1 | 9/2004 |

(Continued)

OTHER PUBLICATIONS

Colin L. Beswick et al., "Metal-Alkyl Group Effects on the Thermodynamic Stability and Stereochemical Mobility of B (C6F5)3-Derived Zr and Hf Metallocenium Ion-Pairs", J. Am. Chem. Soc. 2000, 122, 10358-10370.

(Continued)

*Primary Examiner* — Ling Siu Choi
*Assistant Examiner* — Thuy-Ai N Nguyen
(74) *Attorney, Agent, or Firm* — Dentons US LLP

(57) ABSTRACT

Provided is a propylene-based elastomer having a narrow molecular weight distribution, a high density in the same comonomer content, and excellent mechanical properties. The propylene-based elastomer includes 50% by weight or more of a propylene-based repeating unit, and satisfies a particular relationship between an ethylene content and a molar ratio of a specific monomer sequence.

9 Claims, 2 Drawing Sheets

(56) References Cited

U.S. PATENT DOCUMENTS

| | | |
|---|---|---|
| 6,884,850 B2 | 4/2005 | Schauder et al. |
| 7,858,717 B2 | 12/2010 | Resconi et al. |
| 2011/0196103 A1 | 8/2011 | Kawahara et al. |
| 2014/0045990 A1 | 2/2014 | Chae et al. |
| 2014/0135445 A1 | 5/2014 | Chae et al. |

FOREIGN PATENT DOCUMENTS

| | | |
|---|---|---|
| EP | 2103634 A1 | 9/2009 |
| EP | 2910559 A1 | 8/2015 |
| EP | 2918591 A1 | 9/2015 |
| JP | 07033827 A | 2/1995 |
| JP | 08183814 A | 7/1996 |
| JP | 3334052 B2 | 10/2002 |
| JP | 2008069369 A | 3/2008 |
| JP | 2009530341 A | 8/2009 |
| JP | 2009533382 A | 9/2009 |
| JP | 2013049863 A | 3/2013 |
| KR | 100820542 B1 | 4/2008 |
| KR | 100917540 B1 | 9/2009 |
| KR | 101024894 B1 | 3/2011 |
| KR | 1020120123222 A | 11/2012 |
| KR | 1020140007360 A | 1/2014 |
| KR | 101384401 B1 | 4/2014 |
| KR | 1020140075965 A | 6/2014 |
| KR | 1020150003145 A | 1/2015 |
| WO | 95/014717 A1 | 6/1995 |
| WO | 02/074817 A2 | 9/2002 |

OTHER PUBLICATIONS

James C. Randall, "Carbon-13 NMR of Ethylene-1-Olefin Copolymers: Extension to the Short-Chain Branch Distribution in a Low-Density Polyethylene", Journal of Polymer Science, Polymer Physics edition, 1973, 11, 275-287.

Masahiro Kakugo, et al., "13C NMR Determination of Monomer Sequence Distribution in Ethylene-Propylene Copolymers Prepared with delta-TiCl3—Al(C2H5)2Cl", Macromolecules 1982, 15, 1150-1152.

Medhi Nekoomanesh et al., "Structural Analysis of Ethylene/Propylene Copolymer Synthesized Using High Activity Bi-supported Ziegler-Natta Catalyst", Iranian Polymer Journal, 2005, vol. 14, No. 9, pp. 793-798.

Yu-Dong Zhang et al., "Fractionation and Characterization for a Propylene-Ethylene Random Copolymer", Polymer Journal, vol. 34, No. 9, pp. 700-708 (2002).

[Fig. 1]
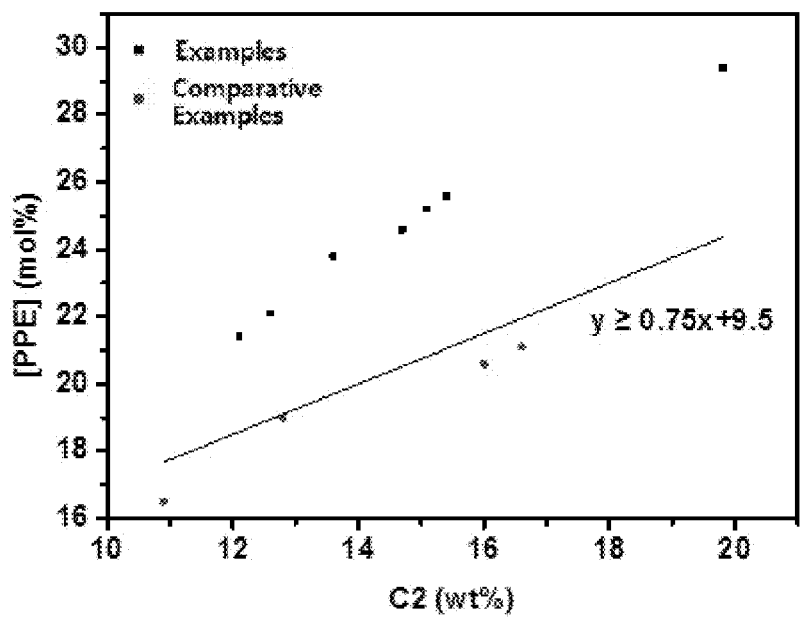
[Fig. 2]
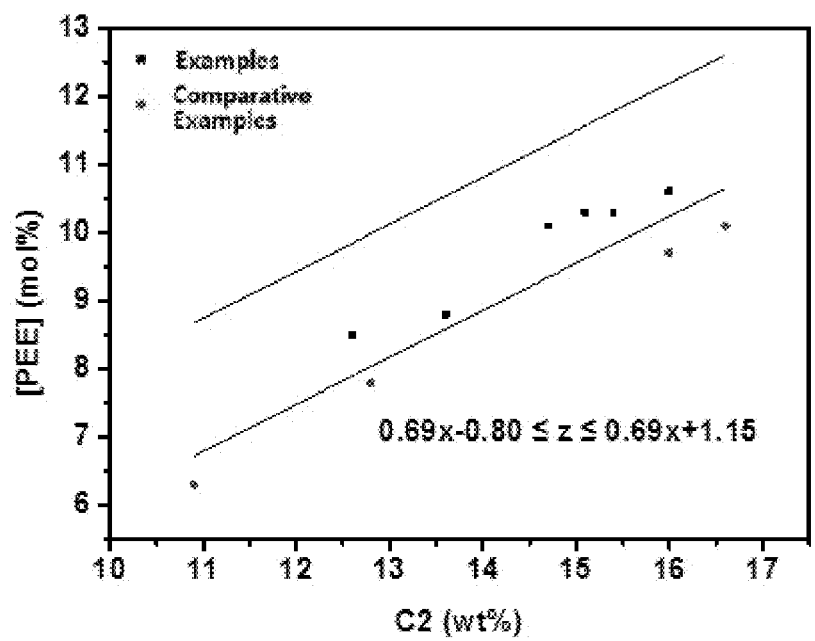

[Fig. 3]
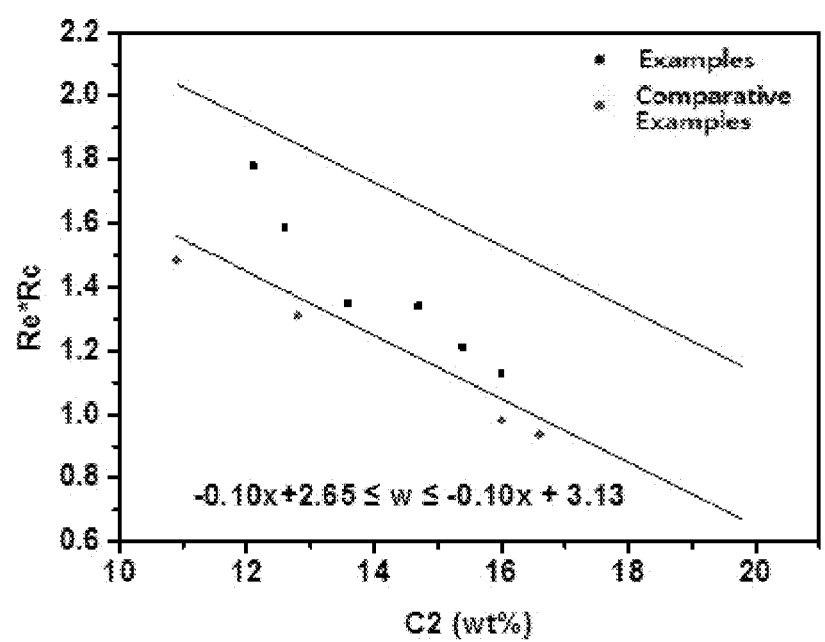

PROPYLENE-BASED ELASTOMER

CROSS-REFERENCE TO RELATED APPLICATION(S)

This application is a National Stage Application of International Application No. PCT/KR2015/005836, filed Jun. 10, 2015, and claims the benefit of Korean Patent Application No. 10-2015-0081131, filed Jun. 9, 2015, and Korean Patent Application No. 10-2014-0070113, filed Jun. 10, 2014, the contents of which are incorporated herein by reference in their entirety for all purposes as if fully set forth below.

TECHNICAL FIELD

The present invention relates to a propylene-based elastomer having a narrow molecular weight distribution, a high density in the same comonomer content, and excellent mechanical properties.

BACKGROUND OF ART

Metallocene catalysts for olefin polymerization have been developed over a long period of time. Generally, metallocene compounds have been used after activated with aluminoxane, borane, borate, or other activators. For example, in the case of a metallocene compound having a ligand including a cyclopentadienyl group and two sigma chloride ligands, aluminoxane is adopted as an activator. It was reported that replacement of the chloride group with another ligand (e.g. benzyl or trimethylsilylmethyl ($-CH_2SiMe_3$)) in the metallocene compound exhibits effects of increased catalytic activity or the like.

EP 1462464 discloses an example of polymerization using a hafnium metallocene compound having chloride, benzyl and trimethylsilylmethyl groups. Also, results were reported that energy generation of active species varied depending on the type of alkyl ligand coupled with a central metal (J. Am. Chem. Soc. 2000, 122, 10358). Korean Patent No. 820542 discloses a catalyst for olefin polymerization having a quinoline-based ligand, and this patent pertains to a catalyst having a living group including silicon and germanium atoms in addition to the methyl group.

In the early 1990s, [$Me_2Si(Me_4C_5)NtBu$]$TiCl_2$ (Constrained-Geometry Catalyst, CGC) was disclosed by DOW in U.S. Pat. No. 5,064,802. In copolymerization of ethylene and alpha-olefin, CGC is superior to metallocene catalysts known to date in terms of (1) high activity even at high polymerization temperature to produce a polymer having a high molecular weight, and (2) very high ability to copolymerize alpha-olefin having high steric hindrance, such as 1-hexene and 1-octene. In addition, a variety of characteristics of CGC are gradually known upon polymerization, and thus ongoing research on synthesis of derivatives thereof to use as a polymerization catalyst has been conducted in academic and industrial fields.

As one approach, it was attempted to synthesize metal compounds including a nitrogen substituent and a variety of other bridges instead of a silicon bridge and to perform polymerization using the same. Representative metal compounds were known to contain phosphorus, ethylene or propylene, methylidene and methylene bridges, in lieu of the silicon bridge of the CGC structure, but did not exhibit superior polymerization activity or copolymerization performance when applied to ethylene polymerization or copolymerization of ethylene and alpha-olefin, compared to CGC.

As another approach, a large number of compounds having an oxido ligand instead of the amido ligand of CGC were synthesized, and there were some attempts to perform polymerization using the same.

However, when a propylene-based elastomer having a narrow molecular weight distribution is prepared by using the known Group 4 transition metal catalyst, it is difficult to prepare the propylene-based elastomer having a high density in the same comonomer content and excellent mechanical properties with high productivity and yield.

DETAILED DESCRIPTION OF THE INVENTION

Technical Problem

Accordingly, the present invention provides a propylene-based elastomer having a narrow molecular weight distribution, a high density in the same comonomer content, and excellent mechanical properties.

Technical Solution

The present invention provides a propylene-based elastomer including 50% by weight or more of a propylene-based repeating unit, and a residual amount of an olefin-based repeating unit containing ethylene, in which an ethylene content x (% by weight) and a molar ratio y (%) of propylene-propylene-ethylene sequence in the propylene-based elastomer satisfy a relationship of $y \geq 0.75x+9.5$.

Hereinafter, a polypropylene-based elastomer according to a specific embodiment of the present invention will be described in detail.

According to an embodiment of the present invention, provided is a propylene-based elastomer including 50% by weight or more of a propylene-based repeating unit, and a residual amount of an olefin-based repeating unit containing ethylene, in which an ethylene content x (% by weight) and a molar ratio y (%) of propylene-propylene-ethylene sequence in the propylene-based elastomer satisfy a relationship of $y \geq 0.75x+9.5$.

The propylene-based elastomer of an embodiment is obtained by copolymerization of propylene and alpha-olefin other than propylene within a predetermined content range, in which a molar ratio of the propylene-propylene-ethylene sequence to the ethylene content is not very low and it may be within an optimized range. In the propylene-based elastomer, accordingly, the ethylene content x (% by weight) and the molar ratio y (%) of propylene-propylene-ethylene sequence in the propylene-based elastomer may satisfy a relationship of $y \geq 0.75x+9.5$, preferably $y \geq 0.75x+10.5$, and more preferably $y \geq 0.75x+11.5$. The propylene-based elastomer satisfying the relationship includes a large amount of propylene-propylene-ethylene sequence, compared to the conventional propylene-based elastomer having a similar ethylene content, which is prepared by a metallocene catalyst, and therefore, the propylene-based elastomer may be in the form of a block copolymer, and may have a high density in the same ethylene content and also exhibit excellent mechanical properties, compared to those having an alternate or random distribution.

In the propylene-based elastomer, the molar ratio y of propylene-propylene-ethylene sequence may be 10 to 30%, and preferably may be 17 to 30%.

Further, in the propylene-based elastomer, the ethylene content x (% by weight) and the molar ratio Z (%) of propylene-ethylene-ethylene sequence in the propylene-based elastomer may satisfy a relationship of $0.69x-0.80 \leq z \leq 0.69x+1.15$, preferably $0.69x-0.80 \leq z \leq 0.69x+0.80$. As described above, the propylene-based elastomer includes a large amount of propylene-ethylene-ethylene sequence as well as propylene-propylene-ethylene sequence, compared to the conventional propylene elastomer having the similar ethylene content, which is prepared by using the metallocene catalyst, thereby being in the form of a copolymer having large amounts of a propylene-propylene block and an ethylene-ethylene block. The propylene-based elastomer in the form of the copolymer may have a high density in the same ethylene content and also exhibit excellent mechanical properties, compared to those having an alternate or random distribution, which are prepared by using the conventional metallocene catalyst.

In the propylene-based elastomer, the molar ratio Z of propylene-ethylene-ethylene sequence may be 1 to 20%, and preferably may be 5 to 15%.

The relationship between the ethylene content and the molar ratio of propylene-propylene-ethylene sequence or propylene-ethylene-ethylene sequence may be satisfied in the entire ethylene content range of 10 to 20% by weight.

The propylene-based elastomer satisfying the above described relationship according to an embodiment may be prepared with high productivity and yield, which are peculiar to, for example, the Group 4 transition metal catalyst belonging to the category of the metallocene catalyst, and may include a large amount of block sequence, unlike conventional propylene-based elastomers prepared by the metallocene-based Group 4 transition metal catalyst, thereby satisfying high density and excellent mechanical properties.

Meanwhile, in the propylene-based elastomer of an embodiment, the molar ratio of propylene-propylene-ethylene sequence or propylene-ethylene-ethylene sequence may be measured by analyzing respective propylene-based elastomers using $^{13}$C-NMR, and for example, calculated by the Triad Sequence analysis using the Randall method [Journal of Polymer Science: Polymer Physics edition, 1973, 11, 275~287] and the Kakugo method [Macromolecules 1982, 15, 1150].

Data for each propylene-based elastomer are displayed by plotting the ethylene content of the propylene-based elastomer on the x-axis and the molar ratio of propylene-propylene-ethylene sequence or propylene-ethylene-ethylene sequence measured for each elastomer on the y-axis. The data are then subjected to linear regression to determine the relationship between the ethylene content x and the molar ratio y of propylene-propylene-ethylene sequence or the molar ratio z of propylene-ethylene-ethylene sequence. Examples of the relationship between x and y, and the relationship between x and z are as illustrated in FIGS. 1 and 2.

As a result of the analysis by this method, it was confirmed that the propylene-based elastomer of an embodiment satisfies a particular relationship between the ethylene content x and the molar ratio y of propylene-propylene-ethylene sequence or the molar ratio z of propylene-ethylene-ethylene sequence. Accordingly, the propylene-based elastomer of an embodiment includes the propylene-propylene sequence and the ethylene-ethylene block sequence in large amounts, compared to the conventional propylene-based elastomers prepared by the metallocene catalyst, thereby showing high density and superior mechanical properties.

Further, the propylene-based elastomer of an embodiment includes about 50% by weight or more, or about 60% by weight or more, or about 70% by weight to 95% by weight of the propylene-based repeating unit, and a residual amount of the olefin-based repeating unit containing ethylene. The propylene-based elastomer includes the propylene-based repeating unit and the olefin-based repeating unit within the above range, thereby being in the form of a block copolymer including large amounts of the block sequences, and having a high density in the same ethylene content and excellent mechanical strength, compared to conventional propylene-based elastomers.

Meanwhile, the olefin-based repeating unit may further contain alpha-olefin having 4 or more carbon atoms. As described above, the propylene-based elastomer must include ethylene as the olefin-based repeating unit, but may further include one or more alpha-olefins having 4 or more carbon atoms.

The alpha-olefin having 4 or more carbon atoms may be one or more alpha-olefins having 4 to 20 carbon atoms such as 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-ldodecene, 12-ethyl-1-tetradecene, etc. Among them, 1-butene, 1-hexene, or 1-octene as a representative example may be properly used.

The propylene-based elastomer of an embodiment may also have a characteristic that the ethylene content x (% by weight) and the product w of ethylene reactivity ratio constant (Re) and propylene reactivity ratio constant (Rp) satisfy a relationship of $-0.10x+2.65 \leq w \leq -0.10x+3.13$. Re is a reactivity ratio constant which represents the distribution state of ethylene, and Rp is a reactivity ratio constant which represents the distribution state of propylene. When the product of Re*Rp is taken as w, the ethylene content x and w may satisfy the relationship of $-0.10x+2.65 \leq w \leq -0.10x+3.13$.

From the above specific value, Re=k11/k12 and Rc=k22/k21, in which k11 is a growth reaction rate constant when ethylene comes after ethylene in the chain of the elastomer, k12 is a growth reaction rate constant when propylene comes after ethylene in the chain of the elastomer, k21 is a growth reaction rate constant when ethylene comes after propylene in the chain of the elastomer, and k22 is a growth reaction rate constant when propylene comes after propylene in the chain of the elastomer.

The individual growth reaction rate constants of k11, k12, k21 and k22 may be measured by analyzing each copolymer using $^{13}$C-NMR, like in the measurement of the molar ratio of the propylene-propylene-ethylene sequence and the molar ratio of the propylene-ethylene-ethylene sequence, and the ethylene content and the Re*Rp value were subjected to linear regression to determine the relationship.

With regard to the propylene-based elastomer of an embodiment, the Re*Rp value as w in the relational expression may be about 1.0 or larger. The propylene-based elastomer may have the Re*Rp value of, for example, about 1.0 to 2.0, or about 1.05 to 1.90, and the elastomer may exhibit properties of a block copolymer resulting from binding of homogeneous monomers, thereby showing high density in the same ethylene content and excellent mechanical strength, compared to general propylene-based elastomers.

The Re*Rp value of less than about 1 indicates that the probability of binding of propylene next to ethylene in the copolymer chain is high, and the probability of binding of ethylene next to propylene in the copolymer chain is high, and thus the copolymer chain has an alternate distribution of ethylene and propylene. In contrast, if the Re*Rp value is about 1, the copolymer chain may have a random distribution between the monomers of ethylene and propylene. If the Re*Rp value is greater than about 1, homogeneous monomers bind to each other and therefore, the copolymer chain may become in the form of a block copolymer.

The propylene-based elastomer of an embodiment may have a density capable of satisfying the properties suitable for the propylene-based elastomer, for example, a density of about 0.860 to 0.890 g/cm$^3$.

Meanwhile, the propylene-based elastomer of an embodiment satisfying a particular relationship between the ethylene content and the molar ratio of propylene-propylene-ethylene sequence or propylene-ethylene-ethylene sequence may be prepared by polymerizing 50% by weight or more of propylene and a residual amount of an olefin-based monomer containing ethylene in the presence of a catalyst composition including a metallocene compound represented by the following Chemical Formula 1:

[Chemical Formula 1]

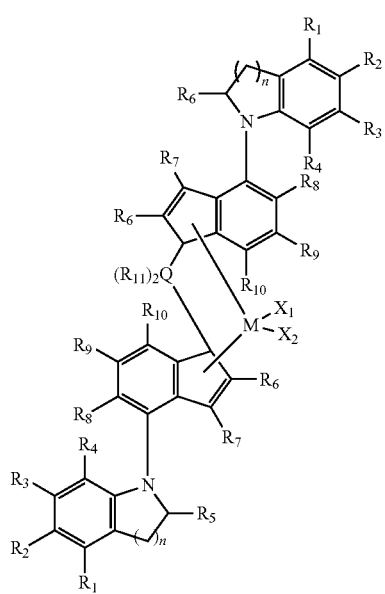

wherein n may be an integer of 1 to 2, $R_1$ to $R_{10}$ may be the same as or different from each other, and each independently hydrogen, an alkyl group having 1 to 20 carbon atoms, an alkoxy group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, or a silyl group, in which 2 or more neighboring groups among $R_1$ to $R_{10}$ may be connected with each other by an alkylidyne group including an alkyl group having 1 to 20 carbon atoms or an aryl group having 6 to 20 carbon atoms to form a ring;

$R_{11}$ is hydrogen, a halogen group, an alkyl group having 1 to 20 carbon atoms, an alkoxy group having 1 to 20 carbon atoms, or an aryl group having 6 to 20 carbon atoms;

Q is carbon or silicon;

M is a Group 4 transition metal;

$X_1$ and $X_2$ are the same as or different from each other, and each independently halogen, an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, an alkylamino group having 1 to 20 carbon atoms, an arylamino group having 6 to 20 carbon atoms, or an alkylidene group having 1 to 20 carbon atoms.

As confirmed in the following examples, while predetermined amounts of monomers, that is, about 50% by weight or more, or about 60% by weight or more, or about 70 to 95% by weight of propylene, and a residual amount of the olefin-based monomer containing ethylene are used, each of the monomers is polymerized in the presence of a catalyst composition including the particular metallocene compound of Chemical Formula 1, thereby obtaining the propylene-based elastomer of an embodiment satisfying the particular relationship between the ethylene content and the molar ratio of propylene-propylene-ethylene sequence or propylene-ethylene-ethylene sequence with high yield and productivity.

This is mainly attributed to excellent catalytic activity and comonomer reactivity of the particular metallocene catalyst. The metallocene compound represented by Chemical Formula 1 has a symmetrical crosslinked structure, in which a bisindenyl group forms a crosslinked structure via carbon or silicon, and a cyclic amine group containing an aromatic ring is linked to each indenyl group. Owing to this structural feature of the metallocene compound, the catalyst composition including the metallocene compound may exhibit excellent catalytic activity, and in particular, excellent selectivity and copolymerization reactivity for propylene and alpha-olefin.

However, when no catalyst including the particular metallocene compound of Chemical Formula 1 is used, or contents of the respective monomers are not within a proper range, the finally prepared propylene-based elastomer may not satisfy the particular relationship between the ethylene content and the molar ratio of propylene-propylene-ethylene sequence or propylene-ethylene-ethylene sequence.

Meanwhile, in a preparation method of the above described propylene-based elastomer of an embodiment, the substituents defined in Chemical Formula 1 are specified below.

The alkyl group includes a linear or branched alkyl group.

The alkenyl group includes a linear or branched alkenyl group.

The aryl group has preferably 6 to 20 carbon atoms, and specific examples thereof include, but are not limited to, phenyl, naphthyl, anthracenyl, pyridyl, dimethylanilinyl, anisolyl, etc.

The alkylaryl group designates an aryl group substituted with the alkyl group.

The arylalkyl group designates an alkyl group substituted with the aryl group.

The halogen group designates a fluorine group, a chlorine group, a bromine group, or an iodine group.

The silyl group includes, but is not limited to, trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, etc.

The aryl group has preferably 6 to 20 carbon atoms, and specific examples thereof include, but are not limited to, phenyl, naphthyl, anthracenyl, pyridyl, dimethylanilinyl, anisolyl, etc.

The heterocyclic group designates a monovalent aliphatic or aromatic hydrocarbon group having cyclic atoms of 5 to 20 carbon atoms and including one or more heteroatoms, and it may be a single ring or a condensed ring of 2 or more rings. Further, the heterocyclic group may or may not be substituted with an alkyl group. Examples thereof may include indoline, tetrahydroquinoline, etc., but the present invention is not limited thereto.

In the metallocene compound represented by Chemical Formula 1, $R_1$ to $R_{10}$ may be more specifically each independently hydrogen, or an alkyl group having 1 to 20 carbon atoms, an aryl group having 6 to 20 carbon atoms, an alkylaryl group having 7 to 20 carbon atoms, an arylalkyl group having 7 to 20 carbon atoms, or a heterocyclic group having 5 to 20 carbon atoms, and $R_{11}$ may be an alkyl group having 1 to 20 carbon atoms or an aryl group having 6 to 20 carbon atoms.

The metallocene compound represented by Chemical Formula 1 may be any one or more compounds selected from the group consisting of compounds of the following formulae, but is not limited thereto:

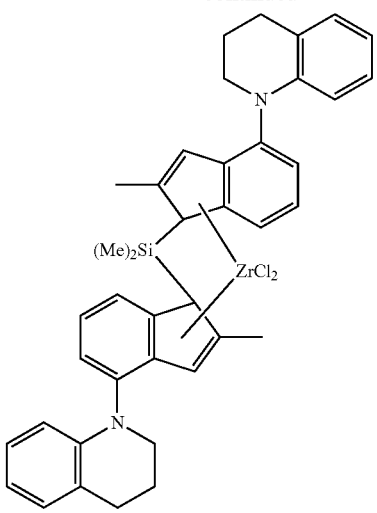

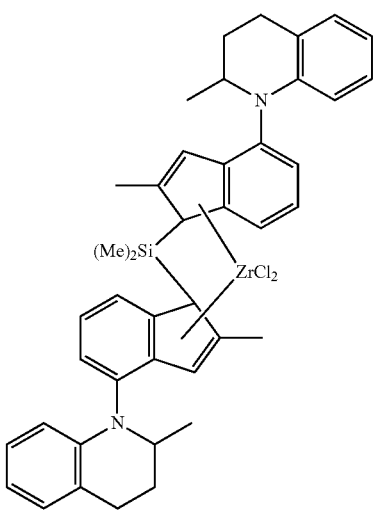

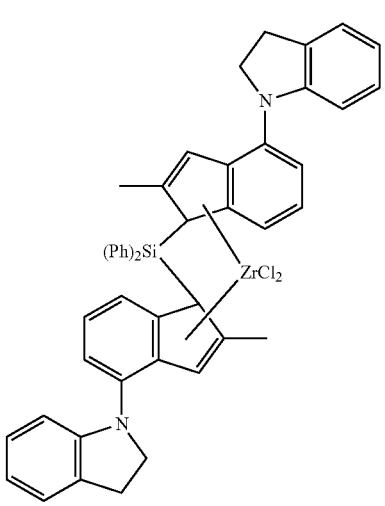

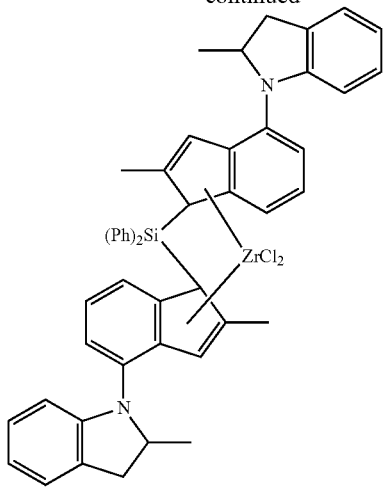
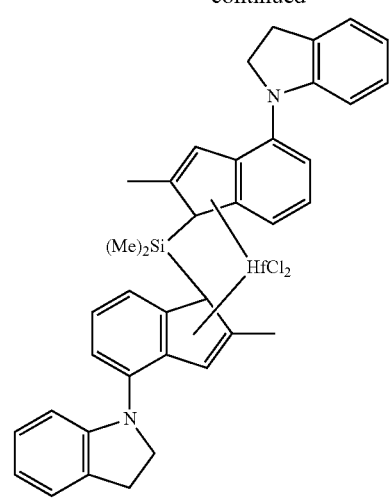
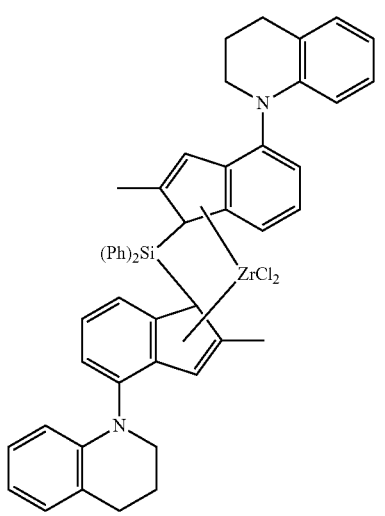
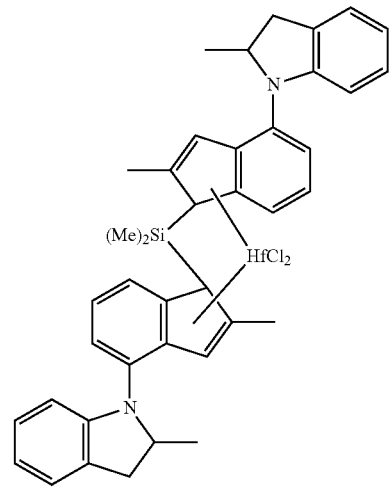
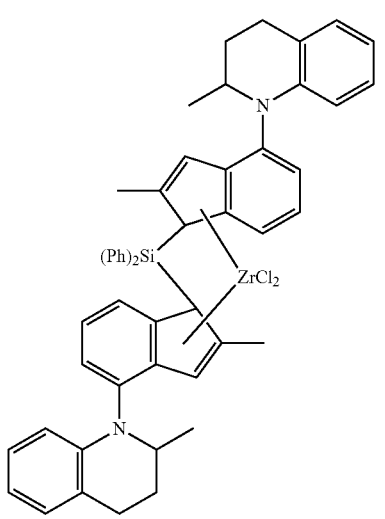
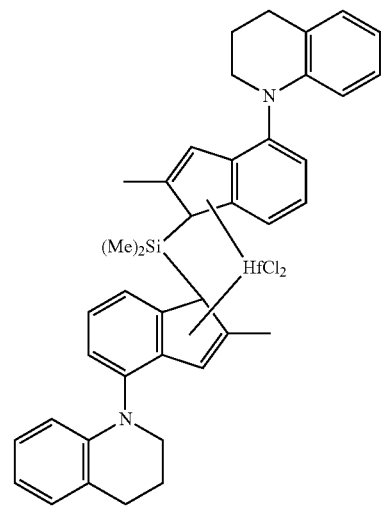

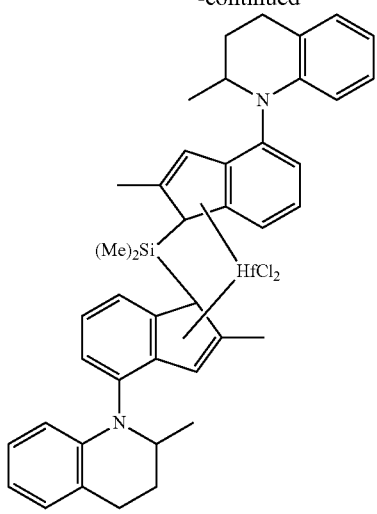

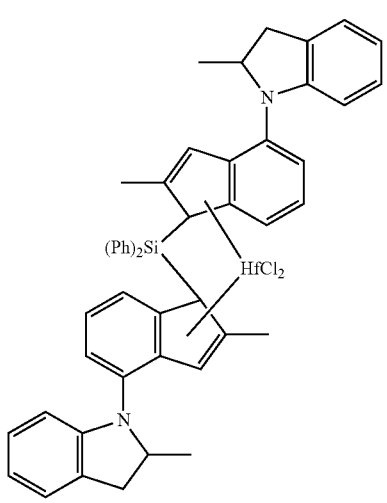

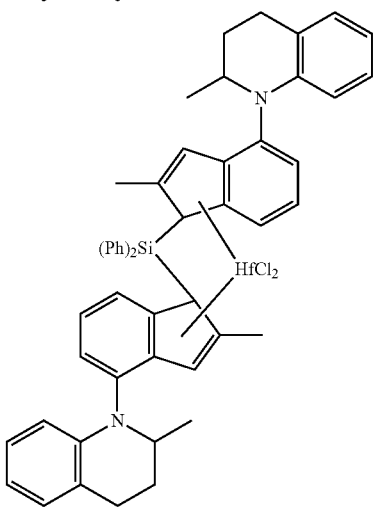

wherein Me represents a methyl group, and Ph represents a phenyl group.

Meanwhile, the catalyst composition used in the preparation method of an embodiment may further include one or more cocatalyst compounds selected from the group consisting of the following Chemical Formula 2 and Chemical Formula 3, in addition to the above described metallocene compound:

$$Al(R_{12})_3 \qquad \text{[Chemical Formula 2]}$$

wherein $R_{12}$ is each independently halogen or hydrocarbyl having 1 to 20 carbon atoms, which is substituted or unsubstituted with halogen;

$$[L\text{-}H]^+[ZA_4]^- \text{ or } [L]^+[ZA_4]^- \qquad \text{[Chemical Formula 3]}$$

wherein L is a neutral or cationic Lewis acid; H is a hydrogen atom; Z is a Group 13 element; and A is each independently aryl or alkyl having 6 to 20 carbon atoms, in which one or more hydrogen atoms thereof are substituted with halogen, hydrocarbyl having 1 to 20 carbon atoms, alkoxy, or phenoxy.

In the catalyst composition, a molar ratio of the transition metal of the compound represented by Chemical Formula 1 and aluminum of the compound represented by Chemical Formula 2 may be 1:1 to 1:1,000, preferably 1:5 to 1:250, and most preferably 1:5 to 1:50. Further, a molar ratio of the transition metal of the compound represented by Chemical Formula 1 and Group 13 element of the compound represented by Chemical Formula 3 may be 1:1 to 1:10, and preferably 1:1 to 1:5.

The compound represented by Chemical Formula 2 may include, but is not particularly limited to, preferably trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, etc., and a preferred compound may be selected from trimethylaluminum, triethylaluminum, and triisobutylaluminum.

Examples of the compound represented by Chemical Formula 3 may include trimethylammonium tetrakis(pentafluorophenyl)borate, triethylammonium tetrakis(pentafluorophenyl)borate, tripropylammonium tetrakis(pentafluorophenyl)borate, tri(n-butyl) ammonium tetrakis (pentafluorophenyl)borate, tri(2-butyl)ammonium tetrakis (pentafluorophenyl)borate, N,N-dimethylanilinium tetrakis (pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris (pentafluorophenyl)borate, N,N-diethylanilinium tetrakis (pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis (pentafluorophenyl)borate, dodecyldimethylammonium tetrakis(pentafluorophenyl)borate, tetradecyldimethylammonium tetrakis(pentafluorophenyl) borate, hexadecyldimethylammonium tetrakis(pentafluorophenyl)borate, octadecyldimethylammonium tetrakis(pentafluorophenyl)borate, eicosyldimethylammonium tetrakis (pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl) borate, methyldieicosylammonium tetrakis(pentafluorophenyl)borate, tridecylammonium tetrakis(pentafluorophenyl) borate, tridodecylammonium tetrakis(pentafluorophenyl) borate, tritetradecylammonium tetrakis(pentafluorophenyl) borate, trihexadecylammonium tetrakis(pentafluorophenyl) borate, trioctadecylammonium tetrakis(pentafluorophenyl) borate, trieicosylammonium tetrakis(pentafluorophenyl) borate, decyldi(n-butyl)ammonium tetrakis (pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl) borate, etc.; examples of a compound binding with a dialkylammonium salt may include di-(i-propyl)ammonium tetrakis(pentafluorophenyl)borate, dicyclohexylammonium tetrakis(pentafluorophenyl)borate, etc.; and examples of a compound binding with a carbonium salt may include tropylium tetrakis(pentafluorophenyl)borate, triphenylmethylium tetrakis(pentafluorophenyl)borate, benzene(diazonium) tetrakis(pentafluorophenyl)borate, etc.

In particular, preferred examples of the compound represented by Chemical Formula 3 may include N,N-dimethylanilinium tetrakis(pentafluorophenyl)borate, tributylammonium tetrakis(pentafluorophenyl)borate, di(octadecyl) methylammonium tetrakis(pentafluorophenyl)borate, di(octadecyl)(n-butyl) ammonium tetrakis(pentafluorophenyl)borate, triphenylmethylium tetrakis(pentafluorophenyl) borate, tropylium tetrakis(pentafluorophenyl)borate, etc.

In the preparation method of the propylene-based elastomer, the catalyst composition may further include a reaction solvent, and the reaction solvent may include a hydrocarbon-based solvent, such as pentane, hexane, heptane, etc.; or an aromatic solvent such as benzene, toluene, etc., but is not limited thereto.

As described above, the olefin-based monomer may further include alpha-olefin having 4 or more carbon atoms in addition to ethylene. The alpha-olefin having 4 or more carbon atoms may include 1-butene, 1-hexene, 1-octene, 1-pentene, 4-methyl-1-pentene, 1-hexene, 1-heptene, 1-decene, 1-undecene, 1-dodecene, etc.

In the preparation method of the above described propylene-based elastomer of an embodiment, the polymerization may be conducted at a temperature of about 25 to 200° C. or about 50 to 150° C. The polymerization process may be carried out by solution polymerization, in particular, continuous solution polymerization. In this regard, the above described catalyst composition may be used in the form of a homogeneous catalyst that is dissolved in the solution.

For carrying out the continuous solution polymerization, the polymerization step may be carried out while continuously providing the above described monomer composition and the catalyst composition including the metallocene compound, and optionally, the cocatalyst compound in the form of a solution to the reactor, and the copolymerization step may be continuously carried out while continuously discharging the polymerized propylene-based elastomer from the reactor.

Advantageous Effects

As described above, prepared is a propylene-based elastomer having a narrow molecular weight distribution, a high density in the same comonomer content, and excellent mechanical properties.

The propylene-based elastomer obtained according to the present invention may have a high density in the same comonomer content and excellent mechanical properties, compared to the previously known propylene-based elastomer prepared by a metallocene-based Group 4 transition metal catalyst.

BRIEF DESCRIPTION OF DRAWINGS

FIG. 1 is a graph showing a relationship between an ethylene content and a molar ratio of [PPE] sequence in propylene-based elastomers of example and comparative example;

FIG. 2 is a graph showing a relationship between an ethylene content and a molar ratio of [PEE] sequence in propylene-based elastomers of example and comparative example; and FIG. 3 is a graph showing a relationship between an ethylene content and Re*Rp in propylene-based elastomers of example and comparative example.

DETAILED DESCRIPTION OF THE EMBODIMENTS

The present invention will be explained in more detail in the following Examples. However, the following Examples are only for exemplifying the invention and the invention is not limited to the following Examples.

In the following Examples, the term "overnight" or "through the night" refers to about 12 to 16 hrs, and "room temperature" refers to 20 to 30° C. Organic reagents and solvents used were purchased from Aldrich and Merck, and used after purification by a standard method. In every steps of synthesis, experimental reproducibility was enhanced by blocking the contact with air and moisture. To confirm structures of the produced compounds, a 600 MHz nuclear magnetic resonance (NMR) spectrometer was used to obtain spectra.

PREPARATION EXAMPLE

Synthesis of Ligand Compound and Transition Metal Compound

Preparation Example 1

Preparation Example 1-1

Synthesis of 1-(2-methyl-1H-inden-4-yl)-1,2,3,4-tetrahydroquinole

To a 500 ml 2-neck Schlenk flask, 4-bromo-2-methyl-1H-indene (15.7 g, 75.63 mmol), 1,2,3,4-tetrahydroquinone (11.08 g, 83.19 mmol), LiOtBu (18.16 g, 226.89 mmol), Pd(P(tBu)$_3$)$_2$ (0.77 g, 1.5 mmol) were added, and the starting materials were dissolved by adding 252 mL of dry toluene, followed by stirring overnight in an oil bath at 110° C. The solution was cooled to room temperature, and then the reaction was terminated by adding 151 mL of deionized water thereto.

After separating an organic layer therefrom, an aqueous layer was extracted twice with 50 mL of dichloromethane (DCM). The organic layer was collected and dried over Na$_2$SO$_4$, and filtered, distilled, and dried under vacuum at 60° C. overnight to obtain an orange colored compound (15.8 g, quantitative yield compared to 4-bromo-2-methyl-1H-indene, 80% yield compared to the starting material).

$^1$H-NMR (CDCl$_3$): δ7.30-7.20 (m, 3H in isomers), 7.15-7.10 (d, J=7.5 Hz, 2H in isomers), 7.15-7.10 (d, J=8.0 Hz, 1H in isomers), 7.10-7.05 (d, J=8.0 Hz, 1H in isomers), 7.05-7.00 (d, J=7.5 Hz, 3H in isomers), 7.00-6.95 (d, J=7.5 Hz, 2H in isomers), 6.90-6.80 (t, J=7.5 Hz, 3H in isomers), 6.65-6.58 (m, 3H in isomers), 6.48 (s, 2H in isomers), 6.33 (s, 1H in isomers), 6.30-6.25 (d, J=8.0 Hz, 1H in isomers), 6.25-6.22 (d, J=8.0 Hz, 2H in isomers), 3.62-3.59 (t, J=5.5 Hz, 6H in 2-quinolinyl of isomers), 3.33 (s, 2H in 1H-indene of isomers), 3.10 (s, 3H in 1H-indene of isomers), 3.00-2.85 (m, 6H in 4-quinolinyl of isomers), 2.22-2.00 (m, 14H in 3H-quinolinyl and 2-Me of isomers)

Preparation Example 1-2

Synthesis of Bis(4-(3,4-dihydroquinolin-1(2H)-yl)-2-methyl-1H-inden-1-yl)-dimethyl silane To a 500 ml Schlenk flask, 1-(2-methyl-1H-inden-4-yl)-1,2,3,4-tetrahydroquinole (15.8 g, 60.5 mmol) was added, and the starting material was dissolved by adding 300 mL of dry diethyl ether, and then n-BuLi (2.5 M in n-Hx) (26.6 mL) was added thereto at −78° C., followed by stirring overnight at room temperature. Then, the mixture was filtered by using a glass frit (G4). The remaining solid on the glass frit was dried under vacuum to obtain a lithiated product (14.4 g, 89% yield) as a while solid. The lithiated product (14.2 g, 53.1 mmol) was put in a 500 mL Schlenk flask in a glove box and 152 mL of dry toluene and 7.6 mL of THF were added thereto for dissolving the same. After lowering the temperature to −30° C., Me$_2$SiCl$_2$ (3.2 mL, 26.6 mmol) was added thereto and the mixture was stirred at room temperature for a day. Thereafter, the mixture was stirred for 5 hrs in an oil bath at 140° C. After the mixture was cooled to room temperature, the reaction was terminated by adding 50 ml of deionized water.

After separating an organic layer therefrom, an aqueous layer was extracted twice with 50 mL of dichloromethane (DCM). The organic layer was collected and dried over K$_2$CO$_3$ and filtered, distilled, and dried under vacuum at 60° C. overnight to obtain a brownish white solid ligand compound (15.8 g, quantitative yield compared to lithiated product, 89% yield compared to the starting material). As the result of $^1$H-NMR analysis, the ratio of rac:meso was about 1:1.

$^1$H-NMR (CDCl$_3$): δ 7.40 (d, J=7.5 Hz, 2H, 7,7'-H in indenyl of rac-isomer), 7.25 (d, J=7.5 Hz, 2H, 7,7'-H in indenyl of meso-isomer), 7.15 (t, J=7.5 Hz, 2H, 6,6'-H in indenyl of rac-isomer), 7.12 (t, J=8.0 Hz, 2H, 6,6'-H in indenyl of meso-isomer), 7.10 (d, J=7 0.5 Hz, 2H, 5,5'-H in quinolinyl of rac-isomer), 7.08 (d, J=7.5 Hz, 2H, 5,5'-H in quinolinyl of meso-isomer), 7.02 (dd, J$_1$=7.0 Hz, J$_2$=1.0 Hz, 4H, 5,5'-H in indenyl of rac- and meso-isomers), 6.85-6.81 (m, 4H, 7,7'-H in quinolinyl of rac- and meso-isomers), 6.60 (td, J$_1$=7.5 Hz, J$_2$=1.0 Hz, 4H, 6,6'-H in quinolinyl of rac- and meso-isomers), 6.46 (s, 4H, 3,3'-H in indenyl of rac- and meso-isomers), 6.26 (d, J=8.0 Hz, 4H, 8,8'-H in quinolinyl of rac- and meso-isomers), 3.81 (s, 2H, 1,1'-H in indenyl of rac-isomer), 3.79 (s, 2H, 1,1'-H in indenyl of meso-isomer), 3.69-3.57 (m, 8H, 2,2'-H in quinolinyl of rac- and meso-isomers), 2.92 (t, J=6.0 Hz, 8H, 4,4'-H in quinolinyl of rac- and meso-isomers), 2.21 (d, J=0.5 Hz, 6H, 2,2'-Me in meso-isomer), 2.13 (d, J=1.0 Hz, 6H, 2,2'-Me in rac-isomer), 2.13-2.08 (m, 8H, 3,3'-H in quinolinyl of rac- and meso-isomers), −0.27 (s, 3H, SiMe of meso-isomer), −0.29 (s, 6H, SiMe$_2$ of rac-isomer), −0.30 (s, 3H, SiMe'-of meso-isomer)

Preparation Example 1-3

Synthesis of rac-dimethylsilylene-bis(4-(3,4-dihydroquinolin-1(2H)-yl)-2-methyl-indenyl) zircoium dichloride To a 500 ml Schlenk flask, 10.4 g (18 mmol, rac:meso=1:1) of bis(4-(3,4-dihydroquinolin-1(2H)-yl)-2-methyl-1H-inden-1-yl)-dimethyl silane was added, and the starting material was dissolved by adding 285 mL of dry toluene, and then 14.4 mL of n-BuLi (2.5 M in n-Hx) was added thereto at −78° C., followed by stirring for 5 hrs at room temperature. The mixture was cooled to −78° C., and transferred to a Schlenk flask, in which 4.2 g of ZrCl$_4$ solution (18 mmol in 60 mL toluene) of −78° C. was put in advance, by using a cannula, followed by stirring at room temperature overnight. After the reaction was terminated, the product was filtered with a glass frit (G4) on which celite spread. The remaining solid on the glass frit was washed three times with about 5 mL of dry toluene. The toluene solution was dried under vacuum to obtain a red colored solid. The remaining solid on the glass frit was dissolved out by using dichloromethane (DCM). A red colored solid was obtained by drying the DCM filtrate under vacuum. As the result of $^1$H-NMR analysis, both of two solids were Zr complex of rac:meso=1:1. This crude product was collected and stored in the oil bath of 45° C., and 50 mL of dry toluene was added thereto with stirring for dissolving the crude product. The solution was stored in a freezer of −30° C. for 3 days for recrystallization. The obtained red solid was filtered with a glass frit (G4) and washed twice with 5 mL of dry n-hexane, and dried under vacuum to obtain 1.3 g (1.9 mmol, 10.4% yield) of the final product of racemic body.

$^1$H-NMR (Tol-d$_3$): δ 7.19 (d, J=8.5 Hz, 2H, 7,7'-H in indenyl), 7.02 (d, J=7.5 Hz, 2H, 5,5'-H in quinolinyl), 6.92 (d, J=7.5 Hz, 2H, 5,5'-H in indenyl), 6.85-6.82 (m, 2H, 7,7'-H in quinolinyl), 6.76 (dd, J$_1$=8.5 Hz, J$_2$=7.5 Hz, 2H, 6,6'-H in indenyl), 6.70-6.68 (m, 2H, 6,6'-H in quinolinyl), 6.67 (s, 2H, 3,3'-H in indenyl), 6.54 (d, J=8.5 Hz, 2H, 8,8'-H in quinolinyl), 3.85-3.69 (m, 4H, 2,2'-H in quinolinyl), 2.65-2.54 (m, 4H, 4,4'-H in quinolinyl), 1.95 (s, 6H, 2,2'-Me), 1.90-1.70 (m, 4H, 3,3'-H in quinolinyl), 0.84 (s, 6H, SiMe$_2$)

Preparation Example 2

Synthesis of rac-dimethylsilylene-bis(4-(3,4-dihydroquinolin-1(2H)-yl)-2-methyl-indenyl) hafnium dichloride To a 250 ml Schlenk flask, 3 g (5.2 mmol, rac:meso=1:1) of bis(4-(3,4-dihydroquinolin-1(2H)-yl)-2-methyl-1H-inden-1-yl)-dimethyl silane prepared in Preparation Example 1-2 was added, and the starting material was dissolved by adding 85 mL of dry toluene, and then 4.4 mL of n-BuLi (2.5 M in n-Hx) was added thereto at −78° C., followed by stirring for 5 hrs at room temperature. The mixture was cooled to −78° C., and transferred to a Schlenk flask, in which 1.7 g of HfCl$_4$ solution (5.2 mmol in 20 mL toluene) of −78° C. was put in advance, by using a cannula, followed by stirring at room temperature overnight. After the reaction was terminated, the product was filtered with a glass frit (G4) on which celite spread. The remaining solid on the glass frit was washed three times with about 3 mL of dry toluene. The toluene solution was dried under vacuum to obtain a red colored solid. The remaining solid on the glass frit was dissolved out by using dichloromethane (DCM). A red colored solid was obtained by drying the DCM filtrate under vacuum. As the result of $^1$H-NMR analysis, both of two solids were Hf complex of rac:meso=1:1. This crude product was collected and stored in the oil bath of 45° C., and 50 mL of dry toluene was added thereto with stirring for dissolving the crude product. The solution was stored in a freezer of −30° C. for 3 days for recrystallization. The obtained red solid was filtered with a glass frit (G4) and washed twice with 3 mL of dry n-hexane, and dried under vacuum to obtain 1.0 g (1.2 mmol, 23% yield) of the final product of racemic body.

$^1$H-NMR (Tol-d$_3$): δ 7.23 (d, J=9.0 Hz, 2H, 7,7'-H in indenyl), 6.98 (d, J=7.5 Hz, 2H, 5,5'-H in quinolinyl), 6.90 (d, J=7.0 Hz, 2H, 5,5'-H in indenyl), 6.82-6.79 (m, 2H, 7,7'-H in quinolinyl), 6.72 (dd, J$_1$=8.5 Hz, J$_2$=7.5 Hz, 2H, 6,6'-H in indenyl), 6.68-6.65 (m, 2H, 6,6'-H in quinolinyl), 6.57 (s, 2H, 3,3'-H in indenyl), 6.51 (d, J=8.5 Hz, 2H, 8,8'-H in quinolinyl), 3.81-3.66 (m, 4H, 2,2'-H in quinolinyl), 2.63-2.53 (m, 4H, 4,4'-H in quinolinyl), 2.03 (s, 6H, 2,2'-Me), 1.87-1.67 (m, 4H, 3,3'-H in quinolinyl), 0.82 (s, 6H, SiMe$_2$)

EXAMPLE

Preparation of Propylene-Based Elastomer

Example 1

A hexane solvent (5 kg/h) and ethylene and propylene monomers were continuously fed at a high pressure of 90 to 100 bar to a 1.5 L continuous stirred reactor which was preheated at 80° C., and solution polymerization was carried out at a pressure of 89 bar. 0.025 mM triphenylcarbenium tetrakis(pentafluorophenyl) borate cocatalyst was put in the reactor by providing high pressure argon. The transition metal compound (0.25 mM) of Preparation Example 2 treated with a triisobutylaluminum compound was put in a catalyst storage tank and subsequently put in the reactor by providing high pressure argon. These two components were separately pumped, and the reactor temperature was controlled by controlling the temperature of oil passing through a reactor jacket. The polymer density was controlled by varying a weight ratio of propylene/ethylene.

After polymerization, the polymers were separated from a discharge stream, and unreacted ethylene and propylene were separated from a dilute mixture stream. The polymers thus obtained were dried in a vacuum oven at 80° C. for 12 hrs or longer and then physical properties thereof were measured.

Polymerization conditions for the propylene-based elastomers of Examples 1 to 7 are given in Table 1.

Comparative Examples 1 to 4

Commercially available propylene-based elastomers, Vistamaxx™6120, Vistamaxx™6202, Vistamaxx™3020, and Vistamaxx™3980 of Exxon Corp. were used as Comparative Examples 1 to 4, respectively and physical properties thereof were measured by the following method.

<Measurement Method of Physical Properties of Propylene Elastomer>

Measurement of Re*Rp and Analysis of Comonomer Sequence in Propylene Elastomer

Each copolymer of Examples and Comparative Examples was analyzed by $^{13}$C-NMR to obtain growth reaction rate constants of k11, k12, k21, and k22 and ratios of comonomer sequences. In this regard, a 600 MHz Bruker Avance III HD NMR instrument was used for measurement, and each copolymer was dissolved in a 1,1,2,2-tetrachloroethane solvent, and analyzed at 120° C.

Each growth reaction rate constant was obtained from the results of $^{13}$C-NMR analysis by Triad Sequence analysis according to the Randall method [Journal of Polymer Science: Polymer Physics edition, 1973, 11, 275-287] and the Kakugo method [Macromolecules 1982, 15, 1150]. Based on the equations of Re=k11/k12 and Rp=k22/k21, Re*Rp value was calculated, and given in the following Tables 2 and 3, and FIGS. 1 to 3.

Measurement of Density

Density was measured at 23° C. using METTLER TOLEDO XS 104 in accordance with the ASTM D1505 standard, and given in the following Tables 2 and 3.

Measurement of MFR

MFR was measured at 230° C. under a load of 2.16 kg using a Dynisco D4002HV instrument in accordance with the ASTM D1238 standard, and given in the following Tables 2 and 3.

Measurement of Tensile Strength and Elongation

Tensile strength and elongation were measured using an INSTRON 4465 instrument in accordance with the ASTM D638 standard, and given in the following Tables 4 and 5.

Measurement of Hardness

Hardness was measured using Mitutoyo CTS-103 and CTS-104 instruments in accordance with the ASTM D2240 standard, and given in the following Tables 4 and 5.

Measurement of Flexural Strength

Flexural strength was measured using an INSTRON 3365 instrument in accordance with the ASTM D790 standard, and given in the following Tables 4 and 5.

Measurement of Tear Strength

Tear strength was measured using an INSTRON 3365 instrument in accordance with the ASTM D624 standard, and given in the following Tables 4 and 5.

TABLE 1

Polymerization conditions of examples

| Unit | Catalyst ml/min | Cocatalyst ml/min | AlR3 ml/min | Polymerization temperature ° C. | Propylene kg/h | Ethylene kg/h | Ethylene/propylene mol ratio | Yield g/h | Activity kg/g (catalyst) |
|---|---|---|---|---|---|---|---|---|---|
| Example 1 | 3.00 | 3.00 | 1.6 | 77.8 | 1.8 | 0.23 | 0.192 | 909 | 244.6 |
| Example 2 | 3.25 | 3.25 | 5.0 | 78.8 | 1.8 | 0.22 | 0.183 | 1027 | 254.8 |
| Example 3 | 3.00 | 3.00 | 1.6 | 77.5 | 1.8 | 0.18 | 0.167 | 865 | 232.5 |
| Example 4 | 2.20 | 2.20 | 5.0 | 77.9 | 1.8 | 0.20 | 0.167 | 871 | 319.5 |
| Example 5 | 1.00 | 1.00 | 5.0 | 80.0 | 1.8 | 0.18 | 0.150 | 1034 | 834.3 |
| Example 6 | 1.60 | 0.80 | 2.6 | 75.6 | 1.8 | 0.15 | 0.125 | 770 | 388.2 |
| Example 7 | 3.00 | 3.00 | 1.6 | 77.0 | 1.8 | 0.14 | 0.117 | 873 | 234.7 |

TABLE 2

Evaluation of physical properties of examples

| Example | Content of repeating unit | | Density | MFR | Triad sequence (mol %) | | Re*Rp |
| | Propylene (% by weight) | Ethylene (% by weight) | | | [PPE] | [PEE] | |
|---|---|---|---|---|---|---|---|
| Example 1 | 84.0 | 16.0 | 0.861 | 31.0 | 25.1 | 10.6 | 1.132 |
| Example 2 | 84.6 | 15.4 | 0.863 | 37.2 | 25.6 | 10.3 | 1.212 |
| Example 3 | 84.9 | 15.1 | 0.867 | 36.8 | 25.2 | 10.3 | 1.281 |
| Example 4 | 85.3 | 14.7 | 0.870 | 47.6 | 24.6 | 10.1 | 1.341 |
| Example 5 | 86.4 | 13.6 | 0.874 | 37.8 | 23.8 | 8.8 | 1.349 |
| Example 6 | 87.4 | 12.6 | 0.878 | 30.2 | 22.1 | 8.5 | 1.588 |
| Example 7 | 87.9 | 12.1 | 0.879 | 52.7 | 21.4 | 8.5 | 1.781 |

TABLE 3

Evaluation of physical properties of comparative examples

| Comparative Example | Content of repeating unit | | Density | MFR | Triad sequence (mol %) | | Re*Rp |
| | Propylene (% by weight) | Ethylene (% by weight) | | | [PPE] | [PEE] | |
|---|---|---|---|---|---|---|---|
| Comparative Example 1 | 83.4 | 16.6 | 0.862 | 3.0 | 21.1 | 10.1 | 0.937 |
| Comparative Example 2 | 84.0 | 16.0 | 0.863 | 20 | 20.6 | 9.7 | 0.983 |
| Comparative Example 3 | 87.2 | 12.8 | 0.874 | 3.0 | 19.0 | 7.8 | 1.311 |
| Comparative Example 4 | 89.1 | 10.9 | 0.878 | 8.0 | 16.5 | 6.3 | 1.484 |

TABLE 4

Evaluation of physical properties of examples

| Physical properties | ASTM | Unit | Example 1 | Example 2 | Example 5 | Example 6 |
|---|---|---|---|---|---|---|
| Elongation | D638 | % | >1000 | >1000 | >1000 | 927.1 |
| Tensile strength (at Break) | D638 | Kgf/cm$^2$ | 132.7 | 137.7 | 195.1 | 227.8 |
| Tensile strength (100% strain) | D638 | Kgf/cm$^2$ | 16.7 | 25.0 | 51.8 | 63.0 |
| Tensile strength (200% strain) | D638 | Kgf/cm$^2$ | 19.5 | 29.4 | 54.9 | 61.9 |
| Tensile strength (300% strain) | D638 | Kgf/cm$^2$ | 22.7 | 34.3 | 59.1 | 66.3 |
| Tensile strength (500% strain) | D638 | Kgf/cm$^2$ | 37.3 | 50.2 | 79.5 | 106.7 |
| Tear strength | D624 | N/cm | 319.6 | 415.7 | 738.6 | 770.3 |
| Flexural Strength | D790 | Kgf/cm$^2$ | 15.5 | 20.4 | 29.6 | 48.8 |
| Flexural Modulus (1% secant) | D790 | Kgf/cm$^2$ | 178.1 | 232.0 | 440.7 | 781.9 |
| Hardness (Shore A) | D2240 | — | 61.1 | 68.9 | 75.4 | 87.9 |
| Hardness (Shore D) | D2240 | — | 12.8 | 16.0 | 28.0 | 34.3 |

TABLE 5

Evaluation of physical properties of comparative examples

| Physical properties | ASTM | Unit | Comparative Example 1 | Comparative Example 2 | Comparative Example 3 | Comparative Example 4 |
|---|---|---|---|---|---|---|
| Elongation | D638 | % | >1000 | >1000 | 777.1 | 861.5 |
| Tensile strength (at Break) | D638 | Kgf/cm$^2$ | 143.9 | 99.8 | 242.8 | 245.8 |
| Tensile strength (100% strain) | D638 | Kgf/cm$^2$ | 17.1 | 16.2 | 46.0 | 61.2 |
| Tensile strength (200% strain) | D638 | Kgf/cm$^2$ | 19.8 | 18.7 | 47.5 | 60.0 |
| Tensile strength (300% strain) | D638 | Kgf/cm$^2$ | 23.2 | 21.4 | 52.3 | 63.9 |
| Tensile strength (500% strain) | D638 | Kgf/cm$^2$ | 35.1 | 29.5 | 90.6 | 100.5 |
| Tear strength | D624 | N/cm | 346.0 | 347.7 | 650.6 | 730.7 |
| Flexural Strength | D790 | Kgf/cm$^2$ | 10.6 | 10.5 | 32.3 | 47.3 |
| Flexural Modulus (1% secant) | D790 | Kgf/cm$^2$ | 109.2 | 111.2 | 372.3 | 737.2 |
| Hardness (Shore A) | D2240 | — | 57.8 | 58.0 | 84.8 | 91.9 |
| Hardness (Shore D) | D2240 | — | 13.0 | 11.2 | 28.4 | 35.1 |

Referring to Tables 2 to 5 and FIGS. 1 to 3, it was confirmed that in the propylene-based copolymers of Examples 1 to 7, an ethylene content x and a molar ratio y of propylene-propylene-ethylene sequence satisfy a relationship of y>0.75x+9.5, and the ethylene content x and a molar ratio z of propylene-ethylene-ethylene sequence satisfy a relationship of 0.69x−0.80≤z≤0.69x+1.15.

In contrast, it was confirmed that the ethylene content x and the molar ratio of propylene-propylene-ethylene sequence or propylene-ethylene-ethylene sequence in the propylene-based copolymers of Comparative Examples 1 to 4 do not satisfy the above relationship, and the copolymers exhibit low values in mechanical properties such as elongation, flexural modulus, tear strength, etc., compared to the propylene-based copolymers of Examples.

Accordingly, it is suggested that the propylene-based copolymers of Examples include a block structure of the propylene-propylene sequence or the ethylene-ethylene sequence in a large amount, thereby exhibiting higher density in the same ethylene content and being excellent in terms of mechanical properties such as elongation, flexural modulus, tear strength, etc.

The invention claimed is:

1. A propylene-based elastomer comprising 50% by weight or more of a propylene-based repeating unit, and a residual amount of an olefin-based repeating unit comprising ethylene, wherein an ethylene content x (% by weight) and a molar ratio y (%) of propylene-propylene-ethylene sequence in the propylene-based elastomer satisfy a relationship of y≥0.75x+9.5.

2. The propylene-based elastomer of claim 1, wherein the ethylene content x (% by weight) and a molar ratio z (%) of propylene-ethylene-ethylene sequence in the propylene-based elastomer satisfy a relationship of 0.69x−0.80≤z≤0.69x+1.15.

3. The propylene-based elastomer of claim 1, wherein the molar ratio y (%) of propylene-propylene-ethylene sequence in the propylene-based elastomer is 10 to 30.

4. The propylene-based elastomer of claim 2, wherein the molar ratio z (%) of propylene-ethylene-ethylene sequence in the propylene-based elastomer is 1 to 20.

5. The propylene-based elastomer of claim 1, wherein the relationships are satisfied in the entire ethylene content range of 10 to 20% by weight.

6. The propylene-based elastomer of claim 1, wherein the olefin-based repeating unit further comprises alpha-olefin having 4 or more carbon atoms.

7. The propylene-based elastomer of claim 1, wherein the ethylene content x (% by weight) and the product w of ethylene reactivity ratio constant (Re) and propylene reactivity ratio constant (Rp) satisfy a relationship of $-0.10x+2.65 \leq w \leq -0.10x+3.13$: $Re=k11/k12$ and $Rc=k22/k21$, wherein k11 is a growth reaction rate constant when ethylene comes after ethylene in the chain of the elastomer, k12 is a growth reaction rate constant when propylene comes after ethylene in the chain of the elastomer, k21 is a growth reaction rate constant when ethylene comes after propylene in the chain of the elastomer, and k22 is a growth reaction rate constant when propylene comes after propylene in the chain of the elastomer.

8. The propylene-based elastomer of claim 7, wherein w is 1.0 or larger.

9. The propylene-based elastomer of claim 1, wherein the propylene-based elastomer has a density of 0.860 to 0.890 g/cm$^3$.

* * * * *